J. R. HILL.
RICKING APPARATUS FOR HAY AND STRAW.
No. 186,007. Patented Jan. 9, 1877.
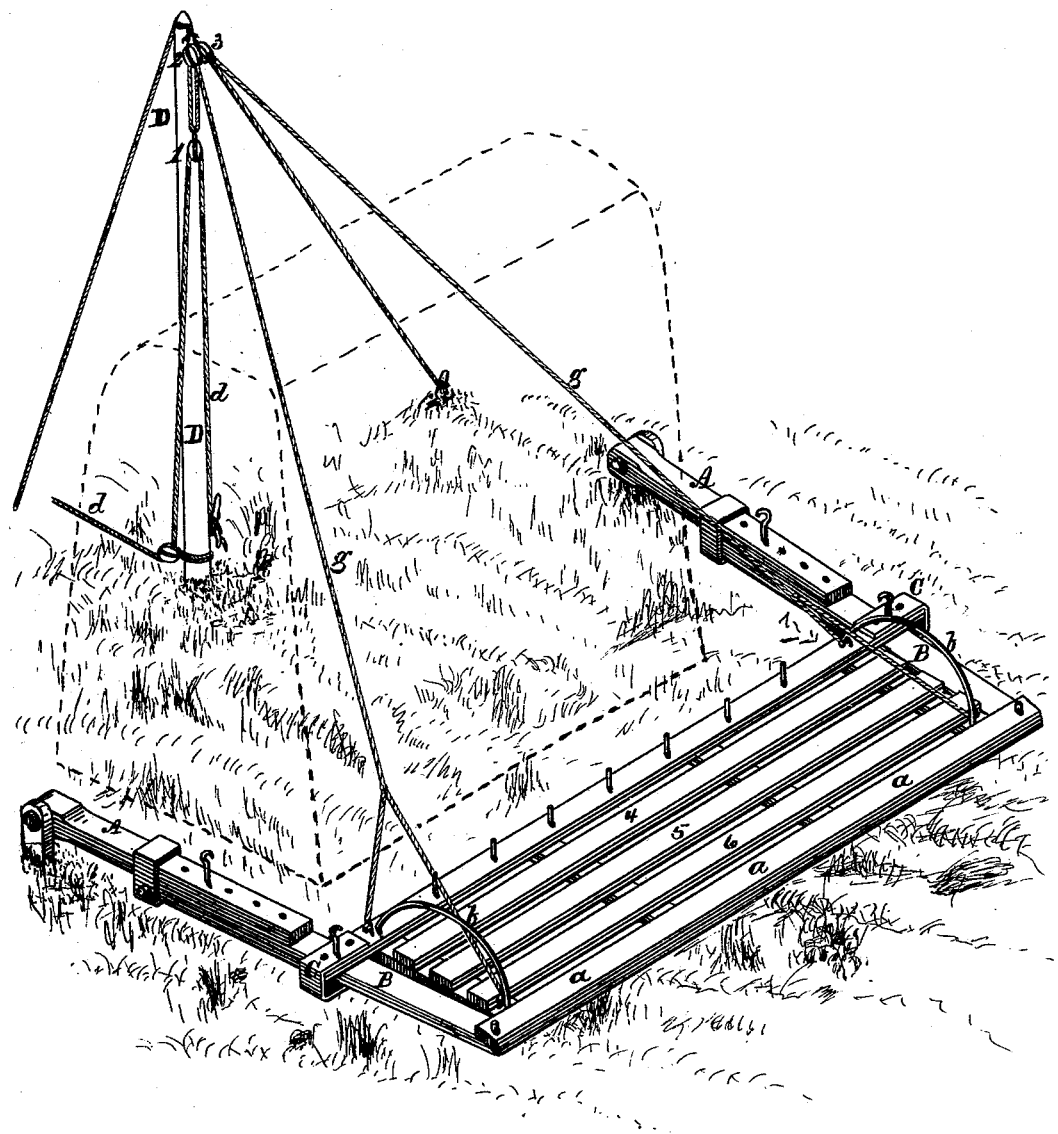

UNITED STATES PATENT OFFICE.

JOHN R. HILL, OF BLOOMFIELD, IOWA.

IMPROVEMENT IN RICKING APPARATUS FOR HAY AND STRAW.

Specification forming part of Letters Patent No. 186,007, dated January 9, 1877; application filed August 7, 1876.

*To all whom it may concern:*

Be it known that I, JOHN R. HILL, of Bloomfield, in the county of Davis and State of Iowa, have invented certain Improvements in a Hay-Ricking Apparatus, of which the following is a specification:

My invention is an improvement of my apparatus patented November 2, 1875, No. 169,542.

It consists in arranging and combining in my hay-ricking apparatus a bridge-board, fenders, loops, ropes, and pulleys, as hereinafter fully set forth.

My drawing is a perspective view, illustrating the construction and operation of my improvements.

$a\ a$ is the inclined and beveled bridge-board, rigidly fixed on the front edge of the platform, composed of the series of bars 4 5 6. In practical use it rests on the ground, and serves as a bridge for the passage of the loaded rake from the ground to the platform. $b\ b$ are the fenders on the ends of the platform. They are formed of bent wood or metal, and attached in any suitable way to aid in retaining the hay on the platform while the platform is being elevated. $c\ c$ are the extended ends and elongated loops or mortises on the lower bar, forming part of the frame of the platform. These loops $c$ may be formed of bent metal attached to the ends of the bar or platform in any suitable way.

By means of this improvement the hinged or pivoted posts A may be set and secured outside of the ends of the stack, and at various angles relative to the platform, by simply adjusting the sliding posts B in the slots $c$. The posts B are made thus adjustable by being pivoted at their top ends to the corners of the movable platform.

$d\ d$ is the rope to which the power is applied to elevate the loaded platform. It is secured to the lower end of the derrick, and passed and doubled through pulley No. 1. $g$ $g$ is the rope applied to the platform. It is doubled by passing it through a ring on pulley No. 1, and then the ends are passed separately through the pulleys Nos. 2 and 3, which pulleys are secured at the top of the derrick D.

By this arrangement and combination of the ropes and pulleys with the derrick and platform, less power is required to elevate the hay to the stack, and the horses attached to the rope $d$ need not walk so far.

I claim as my invention—

In a hay-ricking apparatus, the swinging platform 4 5 6, having the bridge-board $a$, the fenders $b\ b$, loops $c\ c$, and the pivoted adjustable posts B B, in combination with the hinged posts A A, the fixed post D, and the ropes $d$ and $g$, and pulleys 1 2 3, substantially as and for the purposes shown and described.

JOHN W. HILL.

Witnesses:
G. P. FAWKS,
T. J. KIRK.